United States Patent
Raghavan et al.

(10) Patent No.: US 11,157,346 B2
(45) Date of Patent: Oct. 26, 2021

(54) SYSTEM AND METHOD FOR BINNED INTER-QUARTILE RANGE ANALYSIS IN ANOMALY DETECTION OF A DATA SERIES

(71) Applicant: Palo Alto Research Center Incorporated, Palo Alto, CA (US)

(72) Inventors: Ajay Raghavan, Mountain View, CA (US); Ryan A. Rossi, Mountain View, CA (US); Jungho Park, Gwangmyeong-si (KR)

(73) Assignee: Palo Alto Rsearch Center Incorporated

( * ) Notice: Subject to any disclaimer, the term of this patent is extended or adjusted under 35 U.S.C. 154(b) by 141 days.

(21) Appl. No.: 16/143,223

(22) Filed: Sep. 26, 2018

(65) Prior Publication Data

US 2020/0097351 A1    Mar. 26, 2020

(51) Int. Cl.
*G06F 11/07* (2006.01)
*G06F 16/2458* (2019.01)

(52) U.S. Cl.
CPC ........ *G06F 11/079* (2013.01); *G06F 11/0751* (2013.01); *G06F 11/0793* (2013.01); *G06F 16/2465* (2019.01)

(58) Field of Classification Search
CPC ............... G06F 16/2465; G06F 11/079; G06F 11/0793; G06F 11/0751
See application file for complete search history.

(56) References Cited

U.S. PATENT DOCUMENTS

| | | | |
|---|---|---|---|
| 6,401,453 B1 * | 6/2002 | Lemire | F01N 11/007 60/277 |
| 9,753,935 B1 * | 9/2017 | Tobin | G06F 16/1727 |
| 10,216,695 B1 * | 2/2019 | Shankar | G06F 16/2465 |
| 10,223,403 B2 * | 3/2019 | Malhotra | G06F 17/18 |
| 10,929,258 B1 * | 2/2021 | Gauf | G06N 7/005 |
| 2003/0191723 A1 * | 10/2003 | Foretich | G06Q 30/02 705/400 |
| 2007/0257017 A1 * | 11/2007 | Deangelis | H05B 1/0272 219/211 |
| 2008/0091390 A1 * | 4/2008 | Samardzija | G05B 23/0245 703/2 |
| 2008/0315195 A1 * | 12/2008 | Yach | G01R 31/318511 257/48 |

(Continued)

*Primary Examiner* — Matthew M Kim
*Assistant Examiner* — Matthew N Putaraksa
(74) *Attorney, Agent, or Firm* — Shun Yao; Park, Vaughan, Fleming & Dowler LLP.

(57) ABSTRACT

One embodiment provides a system for facilitating anomaly detection. During operation, the system determines, by a computing device, a set of testing data which includes a plurality of data points, wherein the set includes a data series for a first variable and one or more second variables, and wherein the one or more second variables are dependent on the first variable. The system divides the set of testing data into a number of groups based on a type of the data series. The system determines an inter-quartile range for a respective group. The system classifies a first testing data point in the respective group as an anomaly based on the inter-quartile range for the respective group, thereby enhancing data mining and outlier detection for the data series for multiple variables.

20 Claims, 11 Drawing Sheets

(56) References Cited

U.S. PATENT DOCUMENTS

| | | | |
|---|---|---|---|
| 2011/0227605 A1* | 9/2011 | Watanabe | H03K 19/17758 326/38 |
| 2013/0008149 A1* | 1/2013 | Ukropec | F01N 11/005 60/274 |
| 2013/0080375 A1* | 3/2013 | Viswanathan | G06F 11/076 706/52 |
| 2014/0006330 A1* | 1/2014 | Biem | G06F 21/577 706/46 |
| 2016/0314033 A1* | 10/2016 | Polychronis | G06Q 20/407 |
| 2016/0342764 A1* | 11/2016 | Hermida Domingez | G16H 50/30 |
| 2017/0000356 A1* | 1/2017 | Smith, Sr. | G16H 50/20 |
| 2017/0158462 A1* | 6/2017 | Roberts | B66B 11/0407 |
| 2018/0268264 A1* | 9/2018 | Marwah | G06K 9/623 |
| 2018/0309822 A1* | 10/2018 | Baradaran | H04L 67/1008 |
| 2019/0042353 A1* | 2/2019 | Ahad | H04L 41/5003 |
| 2019/0102361 A1* | 4/2019 | Muralidharan | G06F 11/3466 |
| 2019/0146862 A1* | 5/2019 | Kephart | G06F 11/302 714/2 |
| 2019/0180527 A1* | 6/2019 | Segal | G07C 5/0808 |
| 2020/0074370 A1* | 3/2020 | Oliveira Almeida | G06N 5/048 |
| 2020/0134075 A1* | 4/2020 | Park | G06F 16/2465 |
| 2021/0020295 A1* | 1/2021 | Li | G16H 50/20 |

\* cited by examiner

SYSTEM AND METHOD FOR BINNED INTER-QUARTILE RANGE ANALYSIS IN ANOMALY DETECTION OF A DATA SERIES

BACKGROUND

Field

This disclosure is generally related to detecting anomalies. More specifically, this disclosure is related to a system and method for binned inter-quartile range analysis in anomaly detection of a data series.

Related Art

Anomaly detection, or outlier detection, is a data mining method which identifies items or events that do not conform to an expected pattern or others in a data set. Anomaly detection is relevant in various fields, e.g., manufacturing, medical areas, and energy-related fields. For example, in manufacturing, energy usage can incur a significant cost, such as in running a factory with machines or a data center with many machines. To this end, identifying anomalies may provide a more efficient manufacturing system, which can in turn reduce costs and improve the overall efficiency of the system as well as its constituent components or parts.

The type of anomaly detection method used can differ based on the type of classification needed. One method is the Inter-quartile Range (IQR) method. The IQR is a measure of variability based on dividing a data set into four parts, separated by three "quartiles." The IQR is the first quartile subtracted from the third quartile, and is also called the "midspread" or the "middle 50%." An IQR analysis or method can be used to identify anomalies or outliers, and is typically used for given data of only one class, i.e., one-dimensional data.

However, in a two-dimensional or higher dimensional data set (such as two sets of time-series data) which shows different behaviors based on other factors or dependent variables, an IQR analysis may not perform well by itself. Thus, while a standard IQR analysis may provide a robust measure of scale and identify outliers in a one-dimensional data set, a standard IQR analysis in a two-dimensional data set may not provide an accurate measure of scale. Furthermore, in a two-dimensional or higher dimensional data set, a standard IQR analysis may potentially miss identifying outliers or may incorrectly identify normal data points as outliers. This can result in an inefficient system for data mining and anomaly detection.

SUMMARY

One embodiment provides a system for facilitating anomaly detection. During operation, the system determines, by a computing device, a set of testing data which includes a plurality of data points, wherein the set includes a data series for a first variable and one or more second variables, and wherein the one or more second variables are dependent on the first variable. The system divides the set of testing data into a number of groups based on a type of the data series. The system determines an inter-quartile range for a respective group. The system classifies a first testing data point in the respective group as an anomaly based on the inter-quartile range for the respective group, thereby enhancing data mining and outlier detection for the data series for multiple variables.

In some embodiments, the system performs, by a user of the computing device, an action to address the classified anomaly. The action includes one or more of: a remedial or corrective action to ensure that the classified anomaly no longer occurs; adjusting a physical parameter which affects the first variable or the one or more second variables; and adjusting a physical component of a device from which the data series is obtained.

In some embodiments, the system receives, by the computing device, a request to detect anomalies for a new set of testing data, wherein the new set includes a new data series for the first variable and the one or more second variables, wherein the new set of testing data is obtained by the computing device subsequent to the user performing the action to address the classified anomaly. The system divides the new set of testing data into a same number of new groups as the number of groups of the set of testing data. The system determines an inter-quartile range for a respective new group which corresponds to the respective group in which the first testing data point was classified as an anomaly. The system determines whether the first testing data point in the respective group still occurs in the respective new group, which indicates whether the action performed by the user to address the classified anomaly is successful or not.

In some embodiments, dividing the set of testing data into the number of groups is based on one or more of: an automatic process which is based on an algorithm; a resolution of a sensor or a machine involved in obtaining the set of testing data; previous or historical data relating to the set of testing data, wherein the previous or historical data is obtained by the computing device; prior or historical knowledge of a user of the computing device, wherein the prior or historical knowledge is related to the set of testing data and is obtained by the user of the computing device; and decomposing a data distribution of the set of testing data based on a component which is representative of key variables for a higher-dimensional data set, wherein the component includes one or more of a principal component, a derived combination of components, and a linear combination of components, wherein determining the inter-quartile range for the respective group further comprises performing an inter-quartile analysis based on the component.

In some embodiments, dividing the set of testing data and determining the inter-quartile range for the respective group further comprise: automatically classifying a normal distribution in the set of testing data based on multiple dependent variables across the divided groups in the set of testing data, including a presence of testing data points which are classified as an anomaly.

In some embodiments, the data series comprises time-series data for the first variable and the one or more second variables, the time-series data for the first variable is an objective of the anomaly detection, and the time-series data for the one or more second variables affects the time-series data for the first variable.

In some embodiments, determining the inter-quartile range for the respective group further comprises: dividing a second set of testing data in the respective group into four parts based on a median of the second set of testing data, wherein three values which separate the four parts are a first quartile, a second quartile, and a third quartile, and wherein the inter-quartile range is a difference between the first quartile and the third quartile. Determining the inter-quartile range for the respective group further comprises: identifying a lower bound for the second set of testing data by subtracting from the first quartile a first amount equal to the inter-quartile range scaled by a predetermined value; and identifying an upper bound for the second set of testing data by adding to the third quartile a second amount equal to the inter-quartile range scaled by the predetermined value.

In some embodiments, classifying the first testing data point in the respective group as an anomaly is further based on determining that the first testing data point does not fall between the lower bound and the upper bound.

In some embodiments, in response to determining that a number of data points in the second set of testing data is an even number 2n, the system: sets the first quartile as a median of n smallest data points in the second set; and sets the third quartile as a median of n largest data points in the second set. In response to determining that a number of data points in the second set of testing data is an odd number 2m+1, the system: sets the first quartile as a median of m smallest data points in the second set; sets the third quartile as a median of m largest data points in the second set; and sets the second quartile as an ordinary median of data points in the second set.

BRIEF DESCRIPTION OF THE FIGURES

In the figures, like reference numerals refer to the same figure elements.

DETAILED DESCRIPTION

Figure 1:
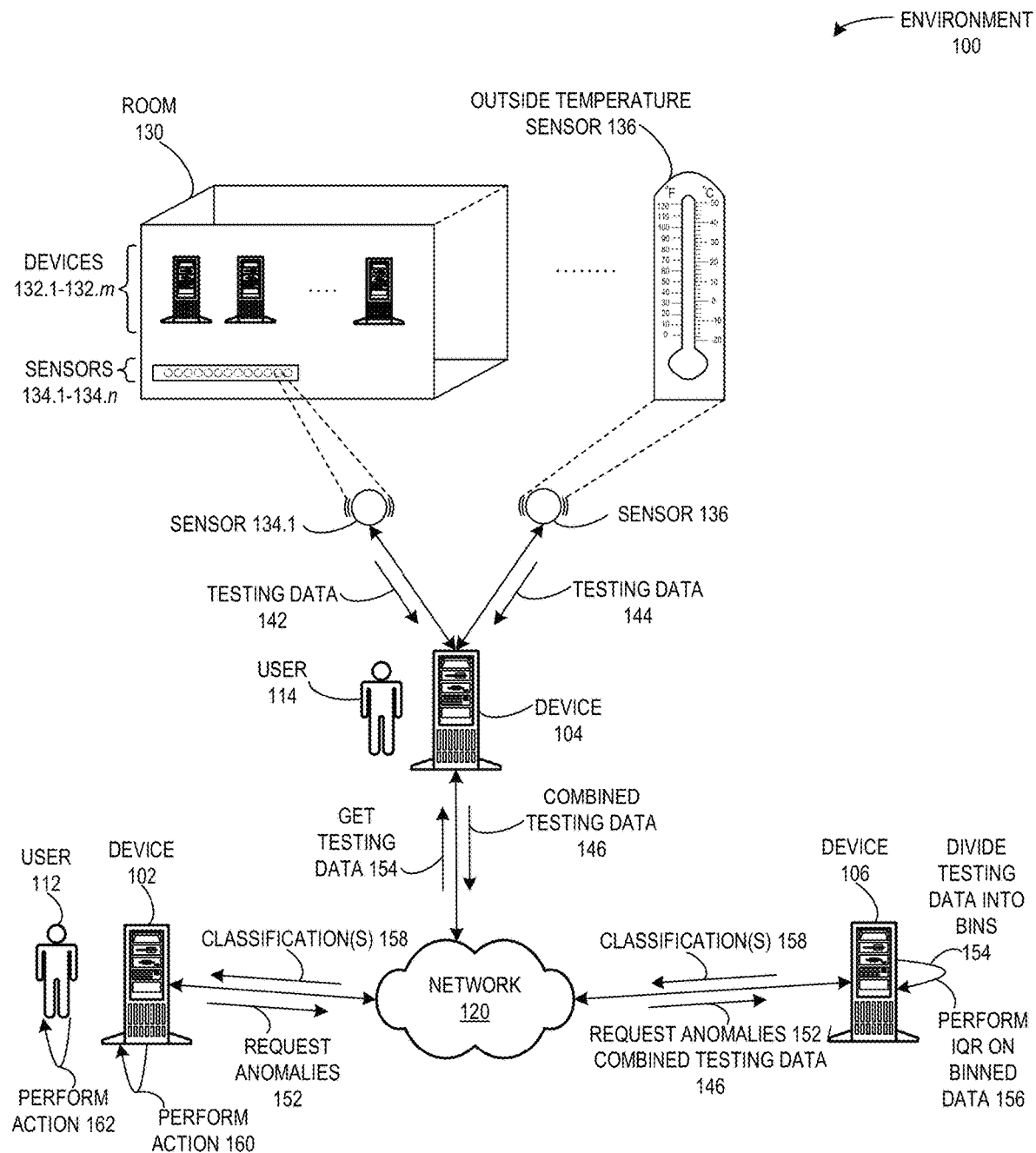
FIG. 1 illustrates an exemplary environment for facilitating anomaly detection, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein solve the problem of efficiently and accurately identifying anomalies in a data series for at least two interdependent variables based on dividing the data into "bins" and performing an IQR analysis on each bin.

As discussed above, identifying anomalies may provide a more efficient system in many areas (e.g., manufacturing, medical fields, and energy-related fields), and can in turn reduce costs and improve the overall efficiency of the system as well as its constituent components or parts. The type of anomaly detection method used can differ based on the type of classification needed. One method is the Inter-quartile Range (IQR) method. The IQR is a measure of variability based on dividing a data set into four parts, separated by three "quartiles." The IQR is the first quartile subtracted from the third quartile, and is also called the "midspread" or the "middle 50%." An IQR analysis or method can be used to identify anomalies or outliers, and is typically used for given data of only one class, i.e., one-dimensional data.

However, in a two-dimensional or higher dimensional data set (such as two sets of time-series data) which shows different behaviors based on other factors or dependent variables, an IQR analysis may not perform well by itself. Thus, while a standard IQR analysis may provide a robust measure of scale and identify outliers in a one-dimensional data set, a standard IQR analysis in a two-dimensional data set may not provide an accurate measure of scale. Furthermore, in a two-dimensional or higher dimensional data set, a standard IQR analysis may potentially miss identifying outliers or may incorrectly identify normal data points as outliers. This can result in an inefficient system for data mining and anomaly detection.

The embodiments described herein address this challenge by providing a system which first divides multiple sets of data series (where each set represents data for an interdependent variable) into a number of distinct groups or "bins," and subsequently performs the IQR analysis on the data in each bin to detect anomalies in the data series, as described below in relation to FIG. 3. That is, the system performs the IQR analysis over a range for at least one other dimension or dependent variable of the data.

Thus, the embodiments described herein provide a computer system which improves the efficiency of detecting anomalies in a data series over at least two dimensions or variables using a "binned" IQR analysis. The data series, e.g., can include time-series data or can cover a frequency spectra. The system enhances and improves data mining and outlier detection in a data series for multiple interdependent variables or dimensions, where the improvements are fundamentally technological. The improvements can result in a more efficient manufacturing system or other physical system by more effectively identifying anomalies. A system administrator or other user can take a remedial, corrective, or other action based on the identified anomalies to improve the overall efficiency of the manufacturing or other physical system. For example, subsequently obtained time-series data may indicate to the user that the previously detected anomaly or anomalies no longer occur.

Furthermore, the embodiments described herein provide a technological solution (e.g., dividing a set of time-series data over multiple interdependent variables or dimensions into bins and then performing an IQR analysis on each bin to classify anomalies) to a technological problem (improving the efficiency of a manufacturing or other physical system by allowing a user to take an action based on the detected anomalies to, e.g., remove or address the anomalies).

The terms "bins" and "groups" are used interchangeably in this disclosure, and refer to a plurality of data sets, which are created by dividing a (larger or parent) set of testing data. A set of testing data (or a divided/binned set of testing data) can include a plurality of data points.

A set of testing data can be divided into a number of bins or groups based on a "type" of the set of testing data. The type of the set of testing data can depend, e.g., a physical parameter being measured, a physical device or sensor from which a measurement is obtained, a physical component of such a device or sensor, or a category determined by the user or the system.

The terms "IQR method" and "IQR analysis" are used interchangeably in this disclosure, and refer to a process which: detects the inter-quartile range; determines a median, a lower bound, and an upper bound; and classifies outliers or detect anomalies based on the inter-quartile range, including the lower bound and the upper bound.

Exemplary Environment and Communication

FIG. 1 illustrates an exemplary environment 100 for facilitating anomaly detection, in accordance with an embodiment of the present invention. Environment 100 can include: a device 102 and an associated user 112; a device 104 and an associated user 114; and a device 106. Devices 102, 104, and 106 can communicate with each other via a network 120. Environment 100 can also include a physical object with sensors which can record data over a period of time and at periodic intervals. For example, environment 100 can include: a room 130 which can include devices 132.1-132.m and sensors 134.1-134.n; and an outside temperature sensor 136. Sensors 134.1-134.n can monitor a physical feature of the room, such as an amount of heating, ventilation, and air conditioning (HVAC) energy consumed in room 130 or the amount of HVAC energy consumed or used by a specific device in room 130. Outside temperature sensor 136 can monitor the temperature of the air outside the room, whether inside a same building or outside of a building in which room 130 resides.

During operation, the sensors can send their respective measured testing data to device 104. For example, device 104 can obtain testing data 142 from sensor 134.1, and can also obtain testing data 144 from sensor 136. Testing data 142 and 144 can include time-series data and can also cover a frequency spectra. At the same or a different time, user 112 can send a command to request anomalies 152 for certain testing data related to sensors 134.1-134.n of room 130 and outside temperature sensor 136, which can result in sending a get testing data 154 command to device 104.

Device 104 can obtain testing data 142 and 144, and can combine testing data 142 and 144. Device 104 can send combined testing data 146 to device 106 via network 120. Upon receiving request anomalies 152 command along with combined testing data 146, device 106 can divide combined testing data 146 into a number of bins (function 154). Device 106 can subsequently perform an IQR analysis on the data in each bin (function 156). During the IQR analysis, device 106 can identify testing data points from combined testing data 146 (and specifically, from the testing data points in each divided bin or group of testing data) which are not within a range defined by a lower bound and an upper bound for a respective bin, where the lower bound and the upper bound are determined based on the IQR analysis. Device 106 can send classification(s) 158 of the data points in the testing data back to device 102, via network 120.

Upon receiving classification(s) 158, device 102 can perform an action 160, which can include executing a predetermined rule based on the classification(s). For example, the predetermined rule can include automatically adjusting a physical component or unit related to the sensors or devices involved in obtaining the testing data. User 112 can also perform an action 162, which can include reviewing the classified anomaly in light of other historical data. User 112 can also perform an action which results in remediating or discovering a reason for the classified anomaly, and can take measures to prevent such anomalies from occurring again.

That is, classification(s) 158 allows both device 102 and user 112 to use the results of the enhanced data mining and outlier detection based on the IQR analysis performed on the discrete bins or groups. For example, based on the response (i.e., classification(s) 158) to request anomalies 152 command, user 112 can perform or take an action which can affect and improve the operation and performance of a manufacturing system or other physical system associated with room 130 and devices 132.1-132.m in room 130. The action can be a remedial or a corrective action to ensure that the classified anomaly no longer occurs. User 112 can also monitor, observe, and classify subsequent testing data to determine whether the actions of user 112 have the intended effect, including the removal or deletion of any previously detected anomalies.

That is, user 112 can send a new request anomalies command which, along with new combined testing data obtained from the sensors, can be received by device 106. Device 106 can divide the data into bins and perform an IQR analysis on the newly binned data. Device 106 can send new classifications back to device 102 and user 112, which allows device 102 and user 112 to determine whether the previously performed actions (i.e., actions 160 and 162, respectively) has the intended effect (i.e., whether the previously detected anomalies no longer occur).

Thus, the embodiments described herein provide a system which improves and enhances anomaly detection in time-series data over at least two variables or dimensions, and further improves the efficiency of the overall system for data mining and outlier detection.

Exemplary Use of Inter-Quartile Range Analysis in the Prior Art

Figure 2A:
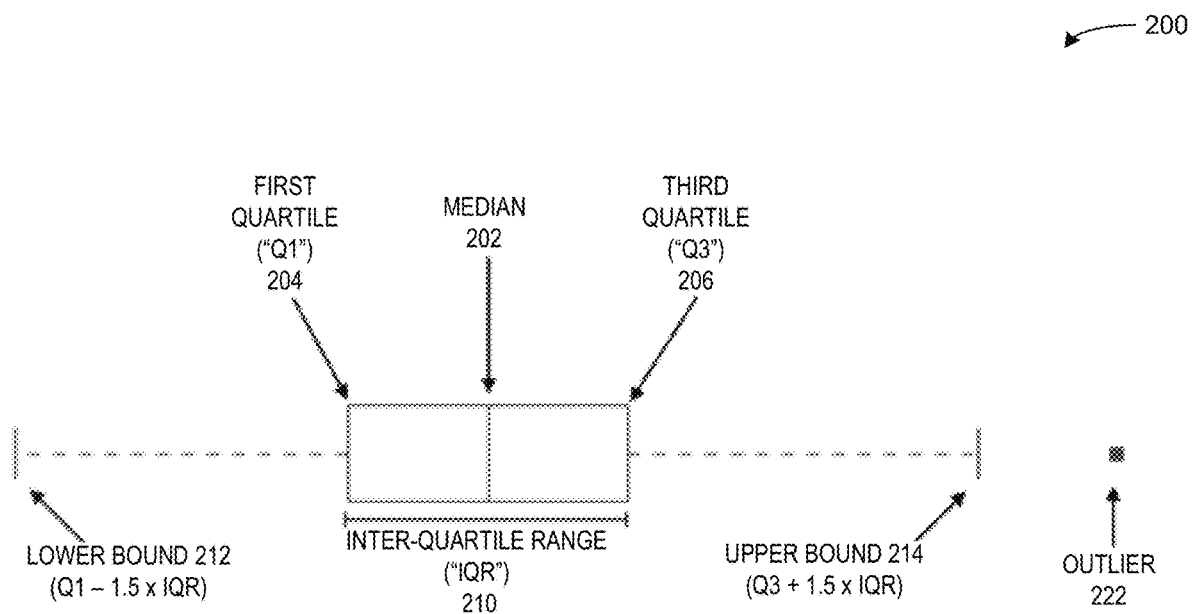
FIG. 2A illustrates an exemplary diagram for determining the inter-quartile range, in accordance with the prior art.

FIG. 2A illustrates an exemplary diagram 200 for determining the inter-quartile range, in accordance with the prior art. Diagram 200 can include data represented in a horizontal fashion, as indicated by the dashed blue line. The system can divide the represented data set into "quartiles," where a quartile divides a rank-ordered data set into four equal parts. A quartile is a value which separates the parts. The first, second, and third quartiles can be referred to as "Q1," "Q2," and "Q3," respectively. The system can determine a median 202, and can further determine a first quartile ("Q1") 204 and a third quartile ("Q3") 206. An inter-quartile range ("IQR") 210 can be defined as a difference between Q3 and Q1. The IQR (which is sometimes called the "midspread" or the "middle 50%") is equal to the difference between the 75th and 25th percentiles, or between upper quartile Q3 and lower quartile Q1.

Furthermore, the system can determine a lower bound 212, by subtracting from the first quartile Q1 a first amount equal to the inter-quartile range scaled by a predetermined value, such as 1.5 (i.e., Q1−1.5×IQR). The system can also determine an upper bound 214, by adding to the third quartile a second amount equal to the inter-quartile range scaled by the predetermined value (i.e., Q3+1.5×IQR). Any data which falls outside of the range defined by lower bound 212 and upper bound 214 may be considered to be an anomaly or an outlier. That is, any data point which does not fall between lower bound 212 and upper bound 214 may be classified as an anomaly or an outlier. For example, an outlier 222 is a data point which is greater than upper bound 214 (i.e., which does not fall between lower bound 212 and upper bound 214). Thus, data point 222 is classified as an outlier.

Figure 2B:
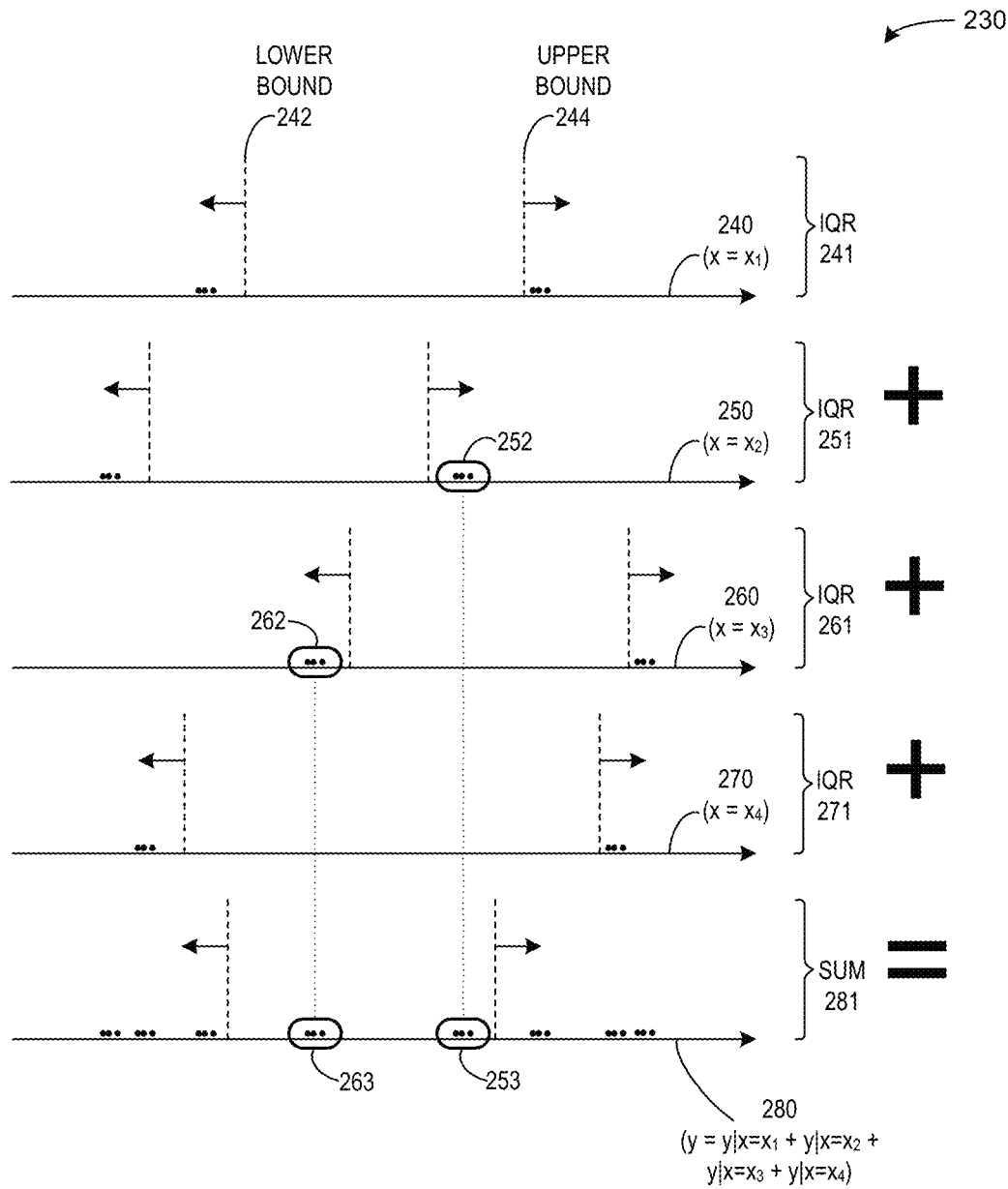
FIG. 2B illustrates an exemplary result of unsuccessfully detecting anomalies based on an inter-quartile range analysis, in accordance with the prior art.

As discussed above, the IQR method is typically used for given data of only one class, i.e., one-dimensional data. However, in a two-dimensional data set which shows different behaviors based on other factors or dependent variables, the IQR method may not perform well by itself. FIG. 2B illustrates an exemplary diagram 230 for a result of unsuccessfully detecting anomalies based on inter-quartile range analysis, in accordance with the prior art. As shown in the index, a detected anomaly 292 is indicated with a small black circle, while undetected anomalies using IQR analysis on one-dimensional data 294 are indicated with a bold oval shape surrounding the black circles.

Assume that one-dimensional data y is composed as a sum of $y|x=x_1$, $y|x=x_2$, $y|x=x_3$, and $y|x=x_4$, based on the effects from the other factor or variable x, as shown in diagram 230. Each row can represent an individual IQR analysis on one-dimensional data y based on one value (e.g., $x_i$) of the other dependent variable x. For example, the system can perform an IQR 241 analysis on the data $y|x=x_1$ (240). IQR 241 can include a lower bound 242 and an upper bound 244, where data which falls outside of these bounds may be considered an anomaly. Similarly, the system can: perform an IQR 251 analysis on the data $y|x=x_2$ (250) and determine anomalies for that data set; perform an IQR 261 analysis on the data $y|x=x_3$ (260) and determine anomalies for that data set; and perform an IQR 271 analysis on the data $y|x=x_4$ (270) and determine anomalies for that data set. The system can determine a sum 281 of these four IQR analyses, including determining a lower bound and an upper bound for the whole two-dimensional data set. Note that while some of the detected anomalies from the individual IQRs 241, 251, 261, and 271 also appear as detected anomalies in sum 281, there are still some detected anomalies from the individual IQRs which do not appear in sum 281. For example, detected anomalies 252 from IQR 251 and anomalies 262 from IQR 261 no longer appear as detected anomalies in sum 281. Instead, these previously detected anomalies now appear between the lower and upper bound of the sum 281 as data 263 and data 253.

Thus, using the IQR method directly on two-dimensional data may result in the inaccurate identification of anomalies, e.g., missing or not correctly detecting (previously detected) anomalies 252 and 262. This can lead to inaccurate results, and can further result in an inefficient overall system.

Method for Facilitating Anomaly Detection Using Binned IQR

Figure 3:
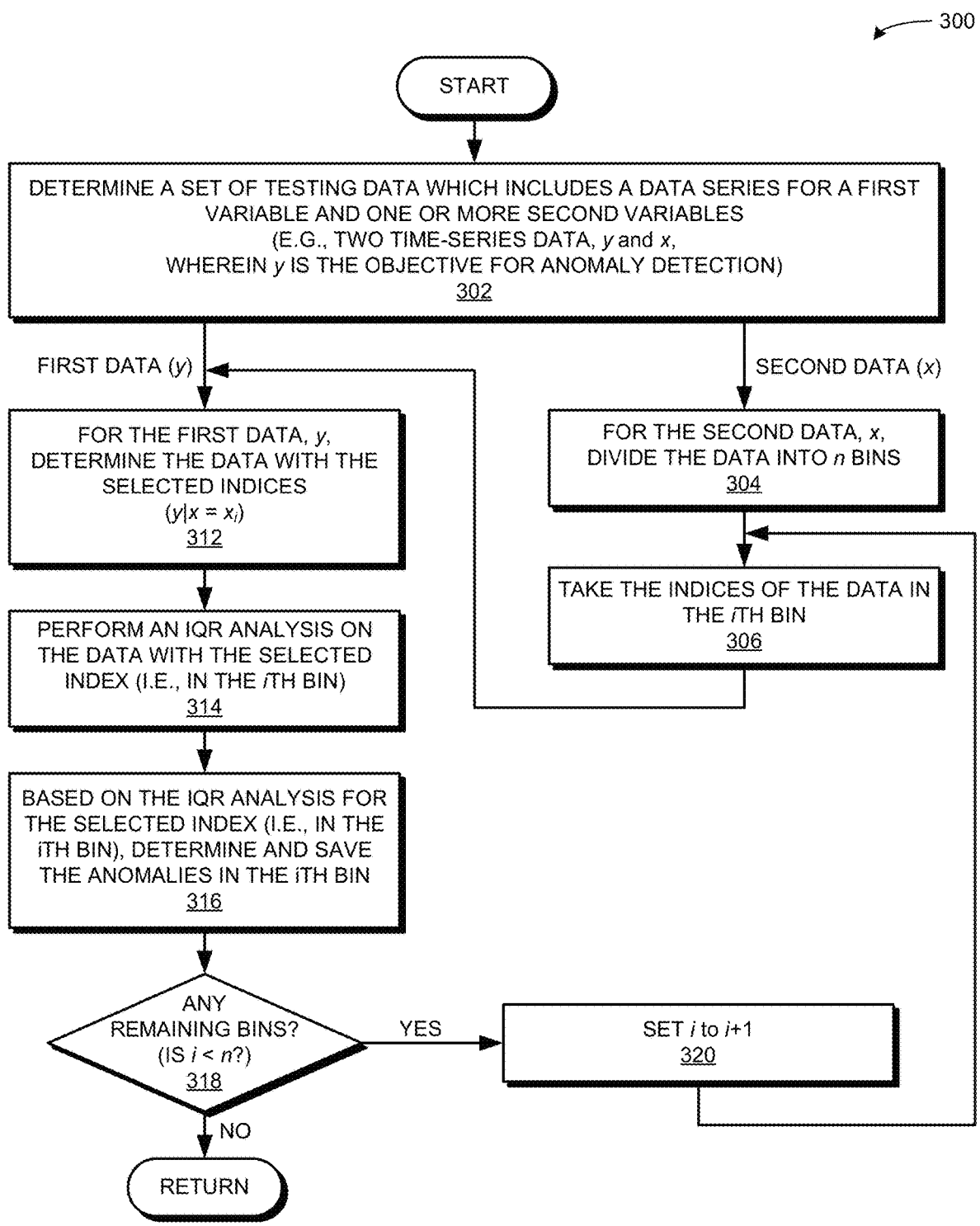
FIG. 3 presents a flow chart illustrating a method for facilitating anomaly detection, in accordance with an embodiment of the present invention.

FIG. 3 presents a flow chart 300 illustrating a method for facilitating anomaly detection, in accordance with an embodiment of the present invention. During operation, the system determines a set of testing data which includes a data series for a first variable and one or more second variables (e.g., two time-series data, y and x, wherein y is the objective for anomaly detection) (operation 302). It is known that the second data x affects the behaviors of the first data y. For the second data x, the system divides the data into n bins (operation 304). The system takes the indices of the data in the ith bin (operation 306) (where i is a value from 0 to n), and passes that into the next operation. For the first data y, the system determines the data with the selected indices ($y|x=x_i$) (operation 312). The system performs an IQR analysis on the data with the selected index (i.e., the data in the ith bin) (operation 314). Based on the IQR analysis for the selected index (i.e., for the data in the ith bin), the system determines the anomalies in the ith bin (operation 316). The system can also save the determined anomalies.

If there are no remaining bins (i.e., the current index i is not less than the number of bins n) (decision 318), the operation returns. If there are remaining bins (i.e., the current index i is less than the number of bins n) (decision 318), the system increments i (by setting i to i+1), and the operation returns to operation 306.

Figure 4B:
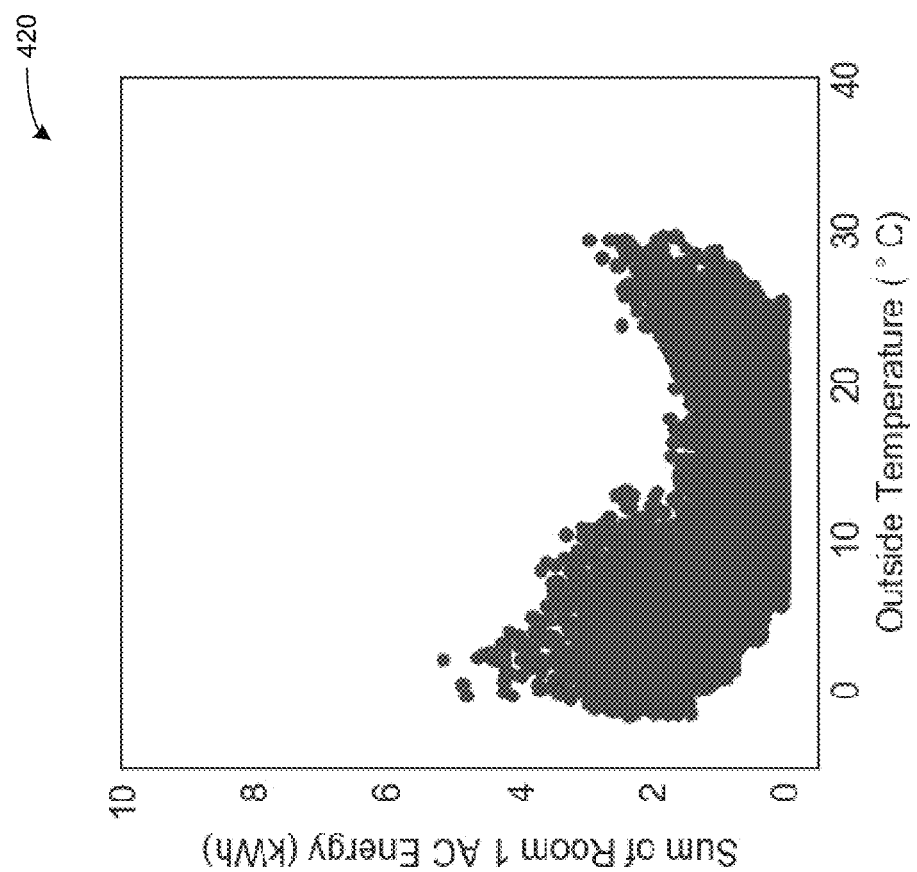
FIG. 4B presents exemplary testing data for the one-dimensional data of FIG. 4A with the addition of another variable, in accordance with an embodiment of the present invention.
Figure 4A:
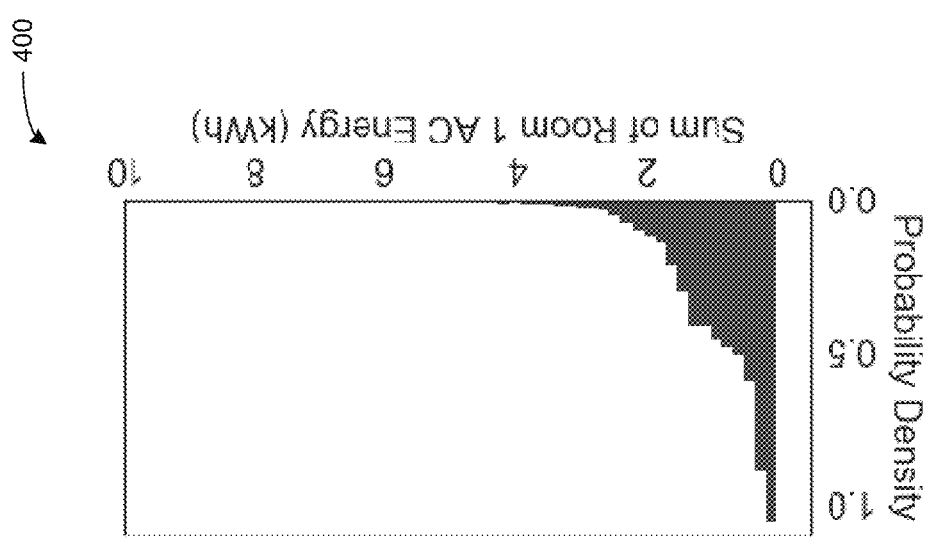
FIG. 4A presents an exemplary probability density for an original set of one-dimensional data, in accordance with an embodiment of the present invention.

Exemplary Graphs Depicting Method for Facilitating Anomaly Detection Using Binned IQR FIG. 4A presents a graph 400 of an exemplary probability density for an original set of one-dimensional data, in accordance with an embodiment of the present invention. Graph 400 can include an x-axis which indicates the probability density, and a y-axis which indicates the sum of the AC energy consumed in "Room 1" (as measured in Kilowatt hours (kWh)). The red color in graph 400 indicates the one-dimensional data.

FIG. 4B presents a graph 420 of exemplary testing data for the one-dimensional data of FIG. 4A with the addition of another variable, in accordance with an embodiment of the present invention. Graph 420 can include an x-axis which indicates the outside temperature (as measured via a temperature sensor in degrees Celsius), and a y-axis which indicates the sum of the AC energy consumed in Room 1 (as measured via multiple sensors in kWh). In graph 420, another dimension or variable of data is added to the one-dimensional data of graph 400. The red color in graph 420 indicates the two-dimensional data.

Figure 4D:
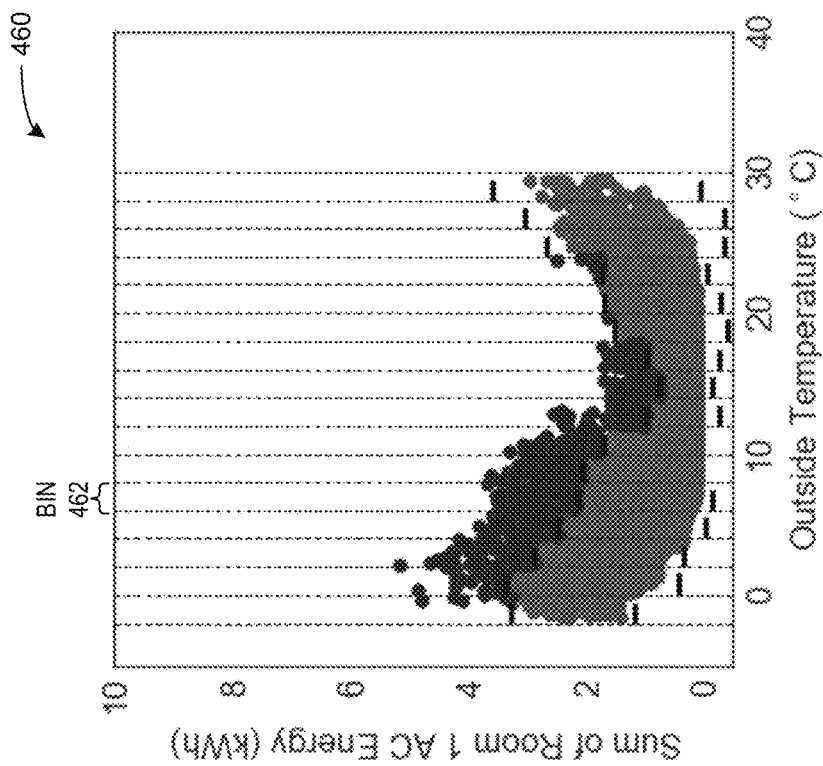
FIG. 4D presents the exemplary testing data of FIG. 4C, including performing an inter-quartile range analysis on the testing data of the divided bins or groups, in accordance with an embodiment of the present invention.
Figure 4C:
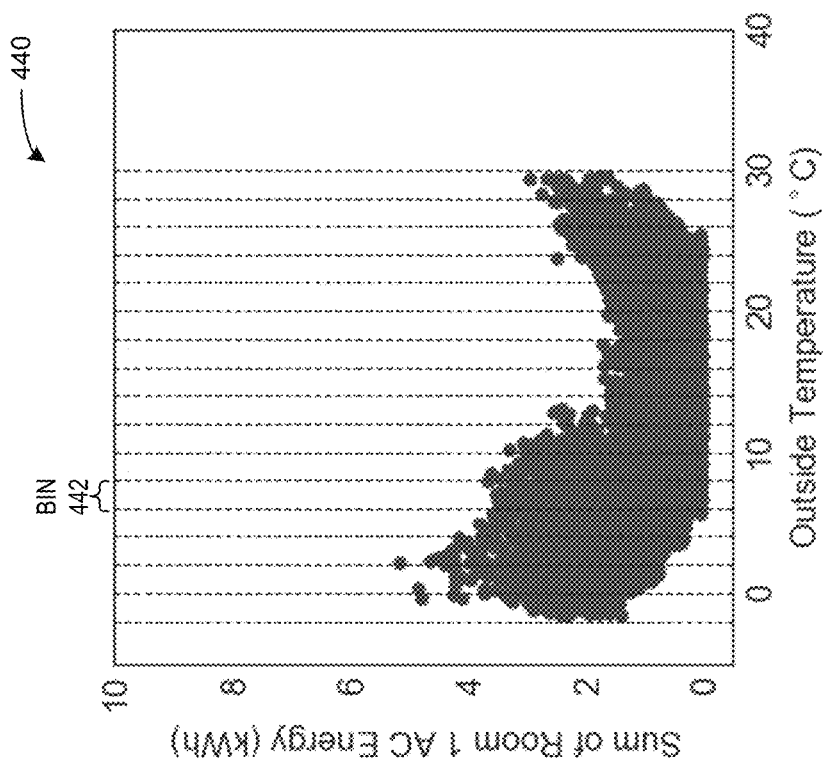
FIG. 4C presents the exemplary testing data of FIG. 4B, including dividing the exemplary testing data into bins or groups, in accordance with an embodiment of the present invention.

FIG. 4C presents a graph 440 of the exemplary testing data of FIG. 4B, including dividing the exemplary testing data into bins or groups, in accordance with an embodiment of the present invention. Graph 440 can include an x-axis which indicates the outside temperature (as measured via a temperature sensor in degrees Celsius), and a y-axis which indicates the sum of the AC energy consumed in Room 1 (as measured via multiple sensors in kWh). In graph 440, the vertical dashed blue lines indicate separations between bins or groups. That is, the system determines a number n of bins, which can be based on, e.g., an automatic process, an algorithm, a resolution of a sensor or a machine involved in obtaining the data, or historical data or knowledge related to the data and obtained by a computing device or a user. In graph 440, the unit of measure or size for each bin is 2 degrees Celsius. For example, a bin 442 includes data from graph 440 for the sum of the room AC energy based on the outside temperature from 6 to 8 degrees Celsius.

FIG. 4D presents a graph 460 of the exemplary testing data of FIG. 4C, including performing an inter-quartile range analysis on the testing data of the divided bins or groups, in accordance with an embodiment of the present invention. Graph 460 can include an x-axis which indicates the outside temperature (as measured via a temperature sensor in degrees Celsius), and a y-axis which indicates the sum of the AC energy consumed in Room 1 (as measured via multiple sensors in kWh). In graph 460, the vertical dashed blue lines indicate separations between bins or groups. The system can perform an IQR analysis on each bin. In each bin, the solid black lines indicate an upper bound and a lower bound, while the green "+" symbol indicates the median for the respective bin. The red color in graph 460 indicates the two-dimensional data which is classified as normal or not classified as an anomaly or an outlier based on the IQR analysis for the respective bin. The blue color in graph 460 indicates the two-dimensional data which is classified as an anomaly or an outlier based on the IQR analysis for the respective bin.

For example, in a bin 462 (which corresponds to bin 442 of graph 440), the red-colored data which falls between the upper bound and the lower bound (i.e., the solid black lines) may be considered as normal data points, while the blue-colored data which falls above the upper bound (or outside of the range between the upper bound and the lower bound) may be considered as anomalous data points or as outliers.

Exemplary Methods for Facilitating Anomaly Detection Using Binned IQR

Figure 5:
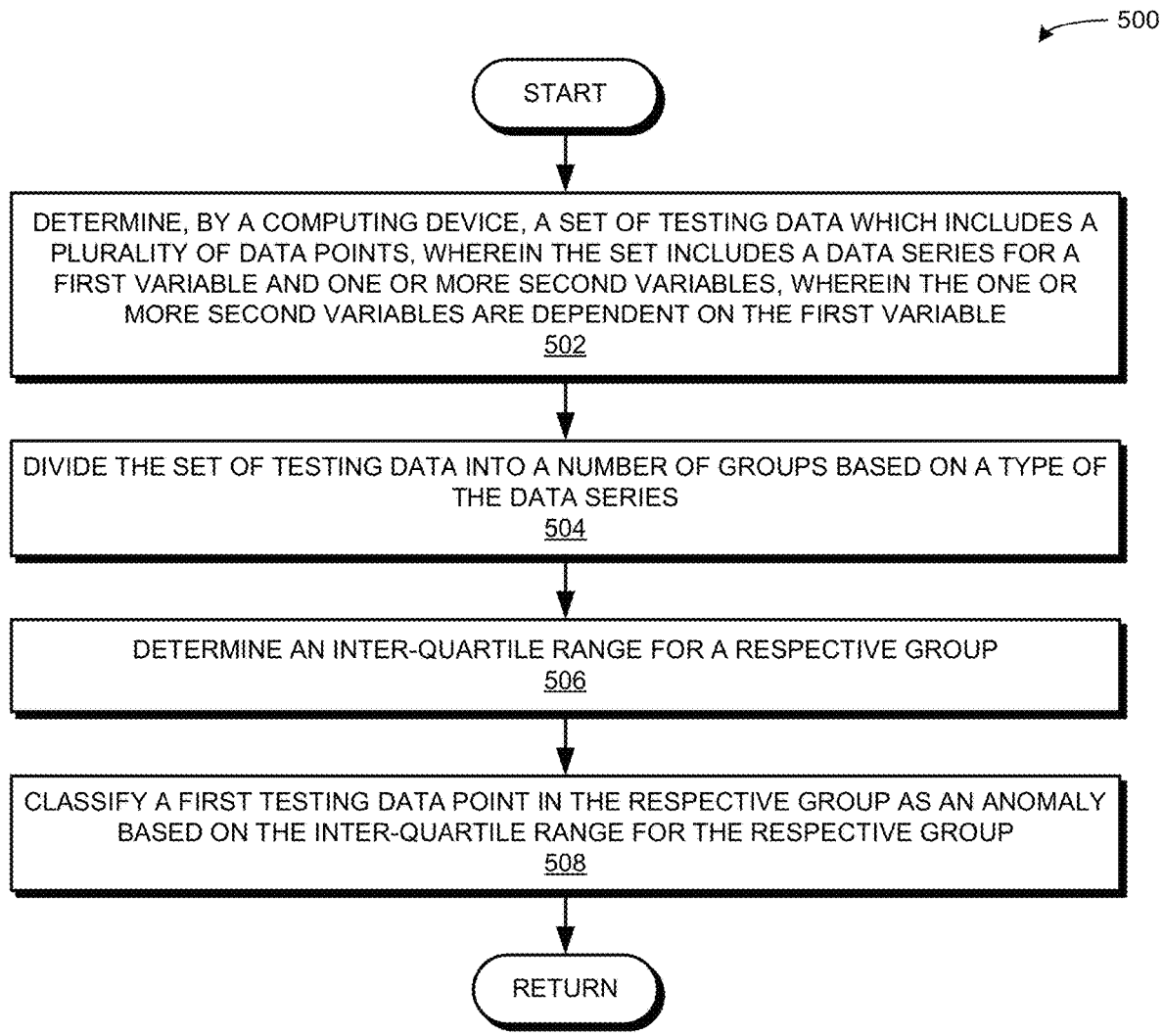
FIG. 5 presents a flow chart illustrating a method for facilitating anomaly detection, in accordance with an embodiment of the present invention.

FIG. 5 presents a flow chart 500 illustrating a method for facilitating anomaly detection, in accordance with an embodiment of the present invention. During operation, the system determines, by a computing device, a set of testing data which includes a plurality of data points, wherein the set includes a data series for a first variable and one or more second variables, wherein the one or more second variables are dependent on the first variable (operation 502). The data series can include time-series data or can cover a frequency spectra. The system divides the set of testing data into a number of groups based on a type of the data series (operation 504). The system determines an inter-quartile range for a respective group (operation 506). The system classifies a first testing data point in the respective group as an anomaly based on the inter-quartile range for the respective group (operation 508), thereby enhancing data mining and outlier detection for the data series for multiple variables.

Figure 6A:
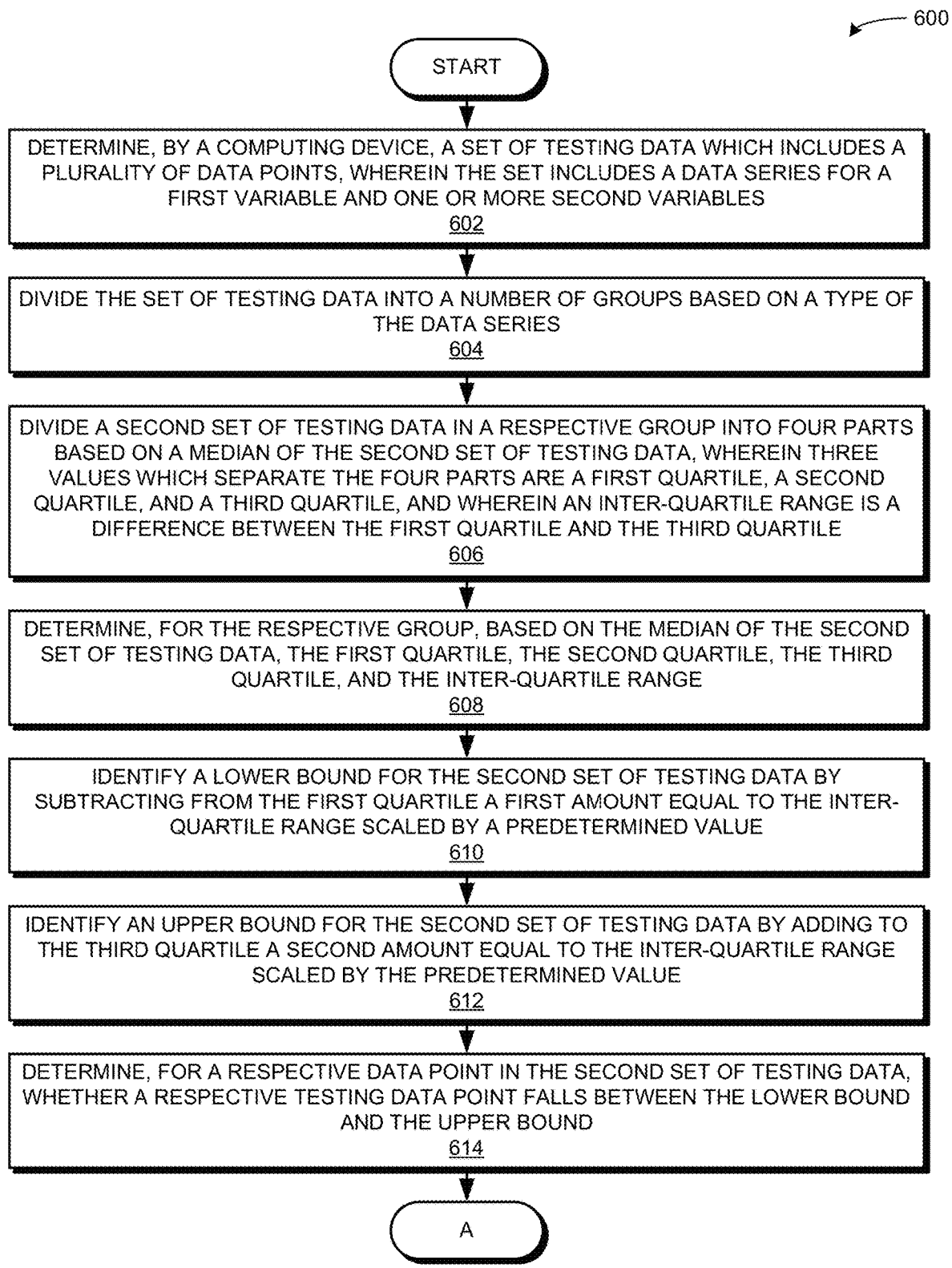
FIG. 6A presents a flow chart illustrating a method for facilitating anomaly detection, in accordance with an embodiment of the present invention.

FIG. 6A presents a flow chart 600 illustrating a method for facilitating anomaly detection, in accordance with an embodiment of the present invention. During operation, the system determines, by a computing device, a set of testing data which includes a plurality of data points, wherein the set includes a data series for a first variable and one or more second variables (operation 602). The one or more second variables are dependent on the first variable. The system divides the set of testing data into a number of groups based on a type of the data series (operation 604). The system divides a second set of testing data in a respective group into four parts based on a median of the second set of testing data, wherein three values which separate the four parts are a first quartile, a second quartile, and a third quartile, and wherein an inter-quartile range is a difference between the first quartile and the third quartile (operation 606). The system determines, for the respective group, based on the median of the second set of testing data, the first quartile, the second quartile, the third quartile, and the inter-quartile range (operation 608). The system identifies a lower bound for the second set of testing data by subtracting from the first quartile a first amount equal to the inter-quartile range scaled by a predetermined value (operation 610). The system also identifies a lower bound for the second set of testing data by adding to the third quartile a second amount equal to the inter-quartile range scaled by the predetermined value (operation 612). The system determines, for a respective data point in the second set of testing data, whether a respective testing data point falls between the lower bound and the upper bound (operation 614). The operation continues as described at Label A of FIG. 6A.

Figure 6B:
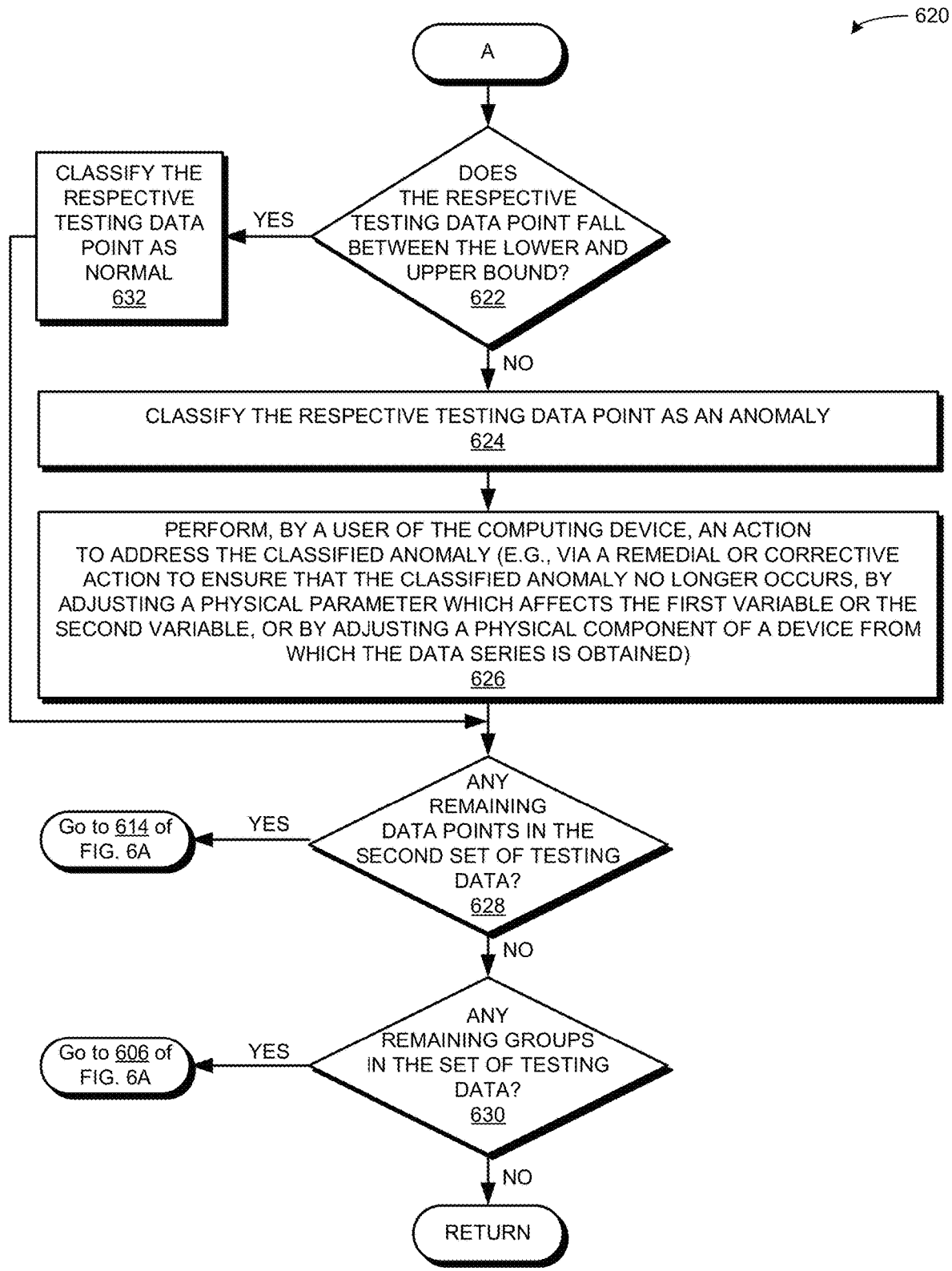
FIG. 6B presents a flow chart illustrating a method for facilitating anomaly detection, in accordance with an embodiment of the present invention.

FIG. 6B presents a flow chart 620 illustrating a method for facilitating anomaly detection, in accordance with an embodiment of the present invention. During operation, if the system determines that the respective testing data point falls between the lower and upper bound (decision 622), the system classifies the respective testing data point as normal (decision 632), and the operation continues at decision 628.

If the system determines that the respective testing data point does not fall between the lower and upper bound (decision 622), the system classifies the respective testing data point as an anomaly (operation 624). The system performs, by a user of the computing device, an action to address the classified anomaly (e.g., via a remedial or corrective action to ensure that the classified anomaly no longer occurs, by adjusting a physical parameter which affects the first variable or the second variable, or by adjusting a physical component of a device from which the data series (e.g., time-series data) is obtained) (operation 626). Note that operation 626 can occur after all anomalies have been classified for a respective group (e.g., for the second set of testing data in the respective group, after decision 628 returns a "no" response), or after all anomalies have been classified for the whole set of testing data (e.g., after decision 630 returns a "no" response).

If there are any remaining data points in the second set of testing data (decision 628), the operation returns to operation 614 of FIG. 6A. If there are no remaining data points in the second set of testing data (decision 628), the system determines whether there are any remaining groups in the set of testing data (decision 630). If there are, the operation returns to operation 606 of FIG. 6A. If there are no remaining groups in the set of testing data (decision 630), the operation returns.

Exemplary Computer and Communication System and Exemplary Apparatus

Figure 7:
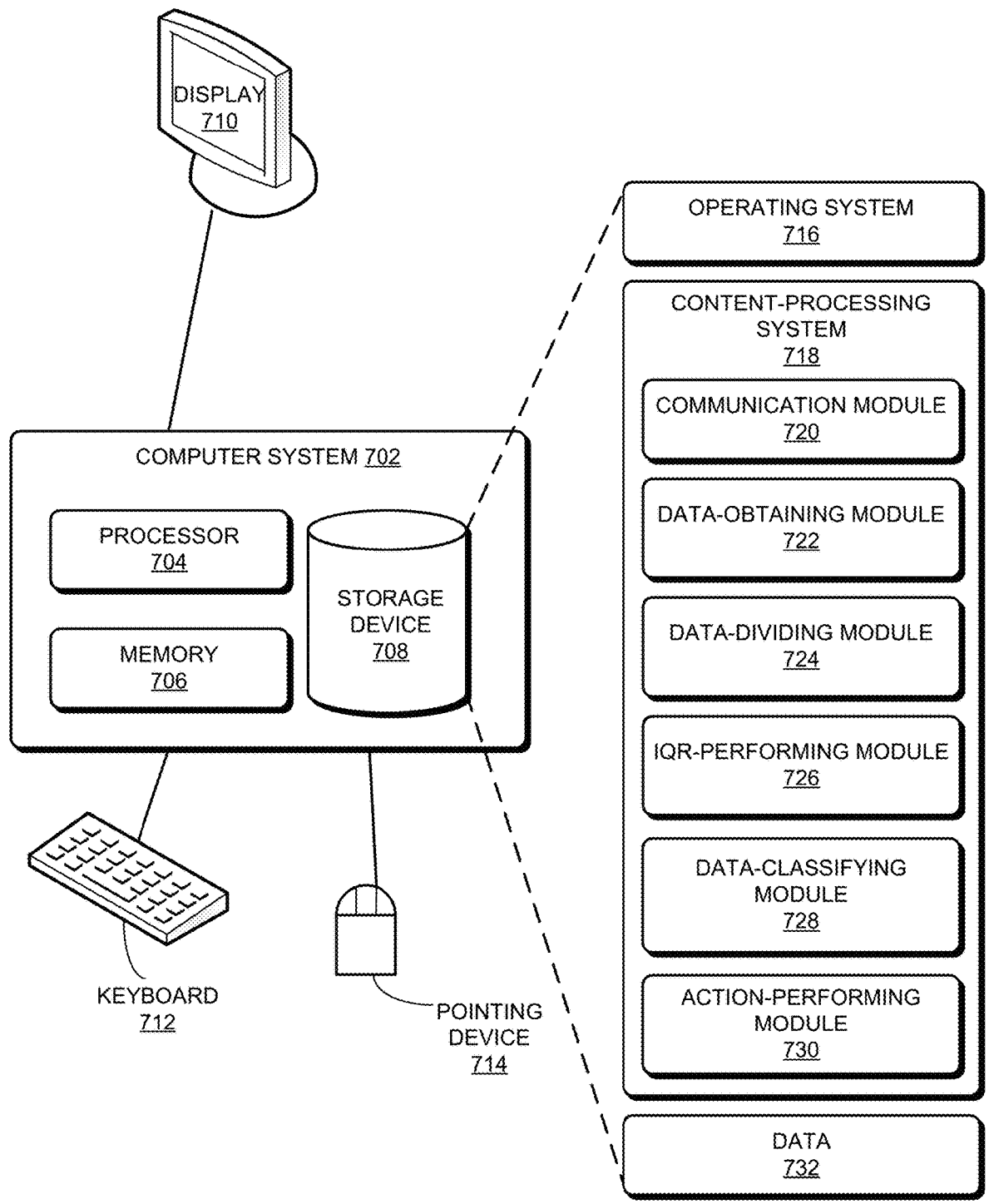
FIG. 7 illustrates an exemplary distributed computer and communication system that facilitates anomaly detection, in accordance with an embodiment of the present invention.

FIG. 7 illustrates an exemplary distributed computer and communication system 702 that facilitates anomaly detection, in accordance with an embodiment of the present invention. Computer system 702 includes a processor 704, a memory 706, and a storage device 708. Memory 706 can include a volatile memory (e.g., RAM) that serves as a managed memory, and can be used to store one or more memory pools. Furthermore, computer system 702 can be coupled to a display device 710, a keyboard 712, and a pointing device 714. Storage device 708 can store an operating system 716, a content-processing system 718, and data 732.

Content-processing system 718 can include instructions, which when executed by computer system 702, can cause computer system 702 to perform methods and/or processes described in this disclosure. Specifically, content-processing system 718 may include instructions for sending and/or receiving data packets to/from other network nodes across a computer network (communication module 720). A data packet can include data, a data series, time-series data, testing data, a set of data, data points, a request, a command, and a response.

Content-processing system 718 can further include instructions for determining, by a computing device, a set of testing data which includes a plurality of data points, wherein the set includes a data series for a first variable and one or more second variables, and wherein the one or more second variables are dependent on the first variable (communication module 720 and data-obtaining module 722). Content-processing system 718 can further include instructions for dividing the set of testing data into a number of groups based on a type of the data series (data-dividing module 724). Content-processing system 718 can further include instructions for determining an inter-quartile range for a respective group (IQR-performing module 726). Content-processing system 718 can further include instructions for classifying a first testing data point in the respective group as an anomaly based on the inter-quartile range for the respective group (data-classifying module 728), thereby enhancing data mining and outlier detection for the data series for multiple variables (data-classifying module 728).

Content-processing system 718 can also include instructions for performing, by a user of the computing device, an action to address the classified anomaly, wherein the action includes one or more of: a remedial or corrective action to ensure that the classified anomaly no longer occurs; adjusting a physical parameter which affects the first variable or the one or more second variables; and adjusting a physical component of a device from which the data series is obtained (action-performing module 730).

Data 732 can include any data that is required as input or that is generated as output by the methods and/or processes described in this disclosure. Specifically, data 732 can store at least: data; a set of testing data; a plurality of data points; a first variable; one or more second variables; time-series data or a frequency spectra for a first and a second variable; a number of groups or bins; a type of the time-series data; an inter-quartile range; a classification for a testing data point; a testing data point which is classified as an anomaly; a testing data point which is classified as a normal data point; an indicator of an enhanced data mining and outlier detection for time-series data for multiple variables; an indicator of an action; a remedial or corrective action; an indicator of a physical parameter which affects the first variable or the second variable; an indicator of a physical component of a device from which the time-series data is obtained; an objective of anomaly detection; an automatic process; an algorithm; an automatic process which is based on an algorithm; a resolution of a sensor or a machine; previous or historical data; prior or historical knowledge; a median; a first quartile; a second quartile; a third quartile; an indicator of four parts; a lower bound; an upper bound; an even number; and an odd number.

Figure 8:
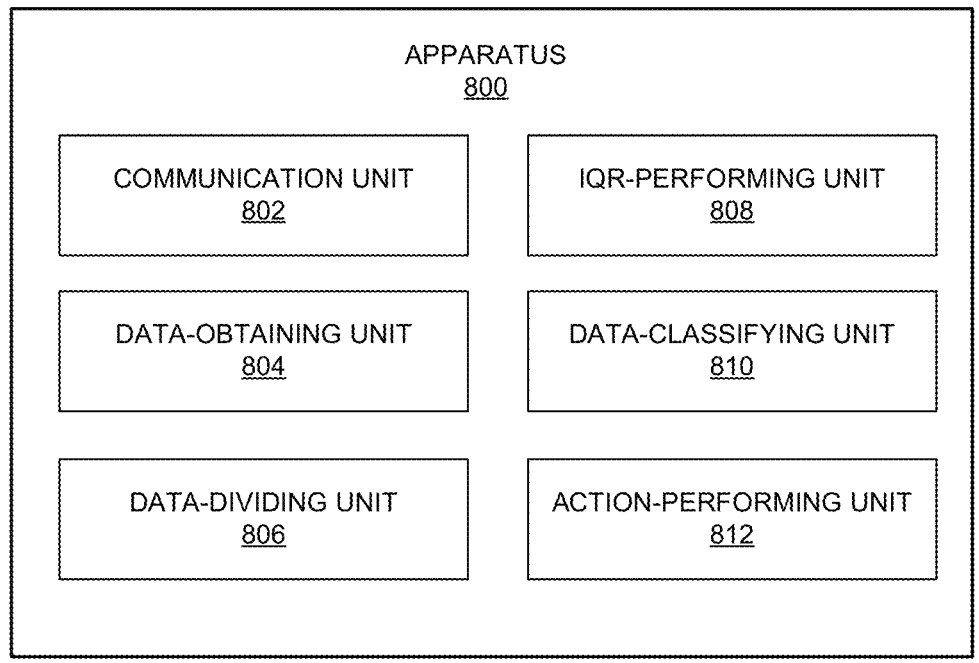
FIG. 8 illustrates an exemplary apparatus that facilitates anomaly detection, in accordance with an embodiment of the present invention.

FIG. 8 illustrates an exemplary apparatus 800 that facilitates anomaly detection, in accordance with an embodiment of the present invention. Apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device which is capable of communicating with other computer systems and/or devices. Specifically, apparatus 800 can comprise units 802-812 which perform functions or operations similar to modules 720-730 of computer system 702 of FIG. 7, including: a communication unit 802; a data-obtaining unit 804; a data-dividing unit 806; an IQR-performing unit 808; a data-classifying unit 810; and an action-performing unit 812.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, a non-transitory computer-readable storage medium, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for facilitating anomaly detection, the method comprising:

obtaining a first data series from a first sensor which monitors a first variable and a second data series from a second sensor which monitors one or more second variables, wherein the first sensor and the second sensor are physical sensors which record data associated with a physical object, and wherein the monitored first variable and the monitored one or more second variables are physical features of the physical object;

determining, by a computing device, a set of testing data which includes a plurality of data points, wherein the set includes the first data series obtained from the first sensor which monitors the first variable and further includes the second data series obtained from the second sensor which monitors the one or more second variables, and wherein the one or more second variables are dependent on the first variable;

dividing the determined set of testing data into a number of groups based on at least a type of the first and second data series, a resolution of the first sensor and the second sensor, and a first physical component of the first sensor and the second sensor;

determining an inter-quartile range for a respective group;

classifying a first testing data point in the respective group as an anomaly based on the inter-quartile range for the respective group;

executing, by the computing device based on the classified anomaly, a predetermined rule by automatically adjusting physical units related to the first sensor and the second sensor; and performing, by a user of the computing device, an action to address the classified anomaly by adjusting a second physical component of a device from which the first data series or the second data series is obtained, thereby enhancing data mining and outlier detection for the first and second data series for multiple variables.

2. The method of claim 1,
wherein the action performed by the user further includes one or more of:
 a remedial or corrective action to ensure that the classified anomaly no longer occurs; and
 adjusting a physical parameter which affects the first variable or the one or more second variables.

3. The method of claim 2, further comprising:
receiving, by the computing device, a request to detect anomalies for a new set of testing data, wherein the new set includes a new first data series obtained from the first sensor which monitors the first variable and further includes a new second data series obtained from the second sensor which monitors the one or more second variables,
wherein the new set of testing data is obtained by the computing device subsequent to the user performing the action to address the classified anomaly;
dividing the new set of testing data into a same number of new groups as the number of groups of the set of testing data;
determining an inter-quartile range for a respective new group which corresponds to the respective group in which the first testing data point was classified as an anomaly; and
determining whether the first testing data point in the respective group still occurs in the respective new group, which indicates whether the action performed by the user to address the classified anomaly is successful or not.

4. The method of claim 1, wherein dividing the set of testing data into the number of groups is based on one or more of:
 an automatic process which is based on an algorithm;
 a resolution of a machine involved in obtaining the set of testing data;
 previous or historical data relating to the set of testing data, wherein the previous or historical data is obtained by the computing device;
 prior or historical knowledge of a user of the computing device, wherein the prior or historical knowledge is related to the set of testing data and is obtained by the user of the computing device; and
 decomposing a data distribution of the set of testing data based on a component which is representative of key variables for a higher-dimensional data set, wherein the component includes one or more of a principal component, a derived combination of components, and a linear combination of components,
wherein determining the inter-quartile range for the respective group further comprises performing an inter-quartile analysis based on the component.

5. The method of claim 1, wherein dividing the set of testing data and determining the inter-quartile range for the respective group further comprise:
 automatically classifying a normal distribution in the set of testing data based on multiple dependent variables across the divided groups in the set of testing data, including a presence of testing data points which are classified as an anomaly.

6. The method of claim 1,
wherein the first data series comprises time-series data for the first variable and the second data series comprises time-series data for the one or more second variables,
wherein the first time-series data for the first variable is an objective of the anomaly detection, and
wherein the second time-series data for the one or more second variables affects the time-series data for the first variable.

7. The method of claim 1, wherein determining the inter-quartile range for the respective group further comprises:
 dividing a second set of testing data in the respective group into four parts based on a median of the second set of testing data,
 wherein three values which separate the four parts are a first quartile, a second quartile, and a third quartile, and
 wherein the inter-quartile range is a difference between the first quartile and the third quartile;
 identifying a lower bound for the second set of testing data by subtracting from the first quartile a first amount equal to the inter-quartile range scaled by a predetermined value; and
 identifying an upper bound for the second set of testing data by adding to the third quartile a second amount equal to the inter-quartile range scaled by the predetermined value.

8. The method of claim 7, wherein classifying the first testing data point in the respective group as an anomaly is further based on determining that the first testing data point does not fall between the lower bound and the upper bound.

9. The method of claim 7,
wherein in response to determining that a number of data points in the second set of testing data is an even number 2n, the method further comprises:
 setting the first quartile as a median of n smallest data points in the second set; and
 setting the third quartile as a median of n largest data points in the second set; and
wherein in response to determining that a number of data points in the second set of testing data is an odd number 2m+1, the method further comprises:
 setting the first quartile as a median of m smallest data points in the second set;
 setting the third quartile as a median of m largest data points in the second set; and
 setting the second quartile as an ordinary median of data points in the second set.

10. A computer system for facilitating anomaly detection, the computer system comprising:
 a processor; and
 a storage device storing instructions that when executed by the processor cause the processor to perform a method, the method comprising:
 obtaining a first data series from a first sensor which monitors a first variable and a second data series from a second sensor which monitors one or more second variables, wherein the first sensor and the second sensor are physical sensors which record data associated with a physical object, and wherein the monitored first variable and the monitored one or more second variables are physical features of the physical object;

determining, by the computer system, a set of testing data which includes a plurality of data points, wherein the set includes the first data series obtained from the first sensor which monitors the first variable and further includes the second data series obtained from the second sensor which monitors the one or more second variables, and wherein the one or more second variables are dependent on the first variable;

dividing the determined set of testing data into a number of groups based on at least a type of the first and second data series, a resolution of the first sensor and the second sensor, and a first physical component of the first sensor and the second sensor;

determining an inter-quartile range for a respective group;

classifying a first testing data point in the respective group as an anomaly based on the inter-quartile range for the respective group;

executing, by the computing device based on the classified anomaly, a predetermined rule by automatically adjusting physical units related to the first sensor and the second sensor; and performing, by a user of the computing device, an action to address the classified anomaly by adjusting a second physical component of a device from which the first data series or the second data series is obtained, thereby enhancing data mining and outlier detection for the data series for multiple variables.

11. The computer system of claim 10, wherein the action performed by the user further includes one or more of:

a remedial or corrective action to ensure that the classified anomaly no longer occurs; and adjusting a physical parameter which affects the first variable or the one or more second variables.

12. The computer system of claim 11, wherein the method further comprises:

receiving, by the computing device, a request to detect anomalies for a new set of testing data, wherein the new set includes a new first data series obtained from the first sensor which monitors the first variable and further includes a new second data series obtained from the second sensor which monitors the one or more second variables, wherein the new set of testing data is obtained by the computing device subsequent to the user performing the action to address the classified anomaly;

dividing the new set of testing data into a same number of new groups as the number of groups of the set of testing data;

determining an inter-quartile range for a respective new group which corresponds to the respective group in which the first testing data point was classified as an anomaly; and determining whether the first testing data point in the respective group still occurs in the respective new group, which indicates whether the action performed by the user to address the classified anomaly is successful or not.

13. The computer system of claim 10, wherein dividing the set of testing data into the number of groups is based on one or more of:

an automatic process which is based on an algorithm;

a resolution of a machine involved in obtaining the set of testing data;

previous or historical data relating to the set of testing data, wherein the previous or historical data is obtained by the computing device;

prior or historical knowledge of a user of the computing device, wherein the prior or historical knowledge is related to the set of testing data and is obtained by the user of the computing device; and decomposing a data distribution of the set of testing data based on a component which is representative of key variables for a higher-dimensional data set, wherein the component includes one or more of a principal component, a derived combination of components, and a linear combination of components, wherein determining the inter-quartile range for the respective group further comprises performing an inter-quartile analysis based on the component.

14. The computer system of claim 10, wherein dividing the set of testing data and determining the inter-quartile range for the respective group further comprise:

automatically classifying a normal distribution in the set of testing data based on multiple dependent variables across the divided groups in the set of testing data, including a presence of testing data points which are classified as an anomaly.

15. The computer system of claim 10, wherein the first data series comprises time-series data for the first variable and the second data series comprises time-series data for the one or more second variables, wherein the first time-series data for the first variable is an objective of the anomaly detection, and wherein the second time-series data for the one or more second variables affects the time-series data for the first variable.

16. The computer system of claim 10, wherein determining the inter-quartile range for the respective group further comprises:

dividing a second set of testing data in the respective group into four parts based on a median of the second set of testing data, wherein three values which separate the four parts are a first quartile, a second quartile, and a third quartile, and wherein the inter-quartile range is a difference between the first quartile and the third quartile;

identifying a lower bound for the second set of testing data by subtracting from the first quartile a first amount equal to the inter-quartile range scaled by a predetermined value; and identifying an upper bound for the second set of testing data by adding to the third quartile a second amount equal to the inter-quartile range scaled by the predetermined value.

17. The computer system of claim 16, wherein classifying the first testing data point in the respective group as an anomaly is further based on determining that the first testing data point does not fall between the lower bound and the upper bound.

18. The computer system of claim 16, wherein in response to determining that a number of data points in the second set of testing data is an even number 2n, the method further comprises:

setting the first quartile as a median of n smallest data points in the second set; and setting the third quartile as a median of n largest data points in the second set; and wherein in response to determining that a number of data points in the second set of testing data is an odd number 2m+1, the method further comprises:

setting the first quartile as a median of m smallest data points in the second set;

setting the third quartile as a median of m largest data points in the second set; and setting the second quartile as an ordinary median of data points in the second set.

19. A non-transitory computer-readable storage medium storing instructions that when executed by a computer cause the computer to perform a method, the method comprising:

obtaining a first data series from a first sensor which monitors a first variable and a second data series from a second sensor which monitors one or more second variables, wherein the first sensor and the second sensor are physical sensors which record data associated with a physical object, and wherein the monitored first variable and the monitored one or more second variables are physical features of the physical object;

determining, by the computer, a set of testing data which includes a plurality of data points, wherein the set includes the first data series obtained from the first sensor which monitors the first variable and further includes the second data series obtained from the second sensor which monitors the one or more second variables, and wherein the one or more second variables are dependent on the first variable;

dividing the determined set of testing data into a number of groups based on at least a type of the first and second data series, a resolution of the first sensor and the second sensor, and a first physical component of the first sensor and the second sensor;

determining an inter-quartile range for a respective group;

classifying a first testing data point in the respective group as an anomaly based on the inter-quartile range for the respective group;

executing, by the computing device based on the classified anomaly, a predetermined rule by automatically adjusting physical units related to the first sensor and the second sensor; and performing, by a user of the computing device, an action to address the classified anomaly by adjusting a second physical component of a device from which the first data series or the second data series is obtained, thereby enhancing data mining and outlier detection for the first and second data series for multiple variables.

20. The storage medium of claim 19, wherein the action performed by the user further includes one or more of:

a remedial or corrective action to ensure that the classified anomaly no longer occurs; and adjusting a physical parameter which affects the first variable or the second variable; and wherein the method further comprises:

receiving, by the computer, a request to detect anomalies for a new set of testing data, wherein the new set includes a new first data series obtained from the first sensor which monitors the first variable and further includes a new second data series obtained from the second sensor which monitors the one or more second variables, wherein the new set of testing data is obtained by the computing device subsequent to the user performing the action to address the classified anomaly;

dividing the new set of testing data into a same number of new groups as the number of groups of the set of testing data;

determining an inter-quartile range for a respective new group which corresponds to the respective group in which the first testing data point was classified as an anomaly; and determining whether the first testing data point in the respective group still occurs in the respective new group, which indicates whether the action performed by the user to address the classified anomaly is successful or not.

* * * * *